US012781921B2

(12) United States Patent
Favilli et al.

(10) Patent No.: US 12,781,921 B2
(45) Date of Patent: Nov. 3, 2026

(54) METHOD AND AN APPARATUS FOR PREVENTING THE EMISSION OF HARMFUL GASES INTO ATMOSPHERE

(71) Applicant: SIME S.R.L., Rosignano Solvay (IT)

(72) Inventors: Stefano Favilli, Rosignano Solvay (IT); Stefano Meucci, Florence (IT)

(73) Assignee: SIME S.R.L., Rosignano Solvay (IT)

( * ) Notice: Subject to any disclaimer, the term of this patent is extended or adjusted under 35 U.S.C. 154(b) by 161 days.

(21) Appl. No.: 18/714,049

(22) PCT Filed: Nov. 27, 2022

(86) PCT No.: PCT/IB2022/061452
§ 371 (c)(1),
(2) Date: May 28, 2024

(87) PCT Pub. No.: WO2023/095079
PCT Pub. Date: Jun. 1, 2023

(65) Prior Publication Data

US 2024/0353064 A1 Oct. 24, 2024

(30) Foreign Application Priority Data

Nov. 29, 2021 (IT) ........................ 102021000030173

(51) Int. Cl.
*F17C 5/00* (2006.01)

(52) U.S. Cl.
CPC ........ *F17C 5/00* (2013.01); *F17C 2205/0326* (2013.01); *F17C 2205/0332* (2013.01); *F17C 2205/0338* (2013.01); *F17C 2227/0157* (2013.01); *F17C 2227/0337* (2013.01); *F17C 2260/044* (2013.01)

(58) Field of Classification Search
CPC ............................................... F17C 2227/0157
See application file for complete search history.

(56) References Cited

U.S. PATENT DOCUMENTS 3,602,002 A * 8/1971 Bailey ........................ F17C 9/00 62/48.2
4,437,813 A * 3/1984 Ingram ................... F04B 39/06 96/182
9,334,109 B1 * 5/2016 Mueller ................... C10G 5/06
(Continued)

*Primary Examiner* — Nicole Gardner
(74) *Attorney, Agent, or Firm* — Maschoff Brennan

(57) ABSTRACT

An apparatus for conveying gas streams leaking at a substantially atmospheric pressure from a plant to a receptor body pressurised at a predetermined reception pressure, comprises a collector container of said streams, a compressor having a suction mouth pneumatically connected to the collector container and a delivery mouth pneumatically connected to the receptor and to the collector container through discharge and recirculation ducts, respectively. In order to adjust the compressor suction pressure at a value below atmospheric pressure and above a minimum value of −200÷−100 Pa, a pressure sensor/transducer is arranged at compressor suction and configured to generate a detected suction pressure signal between the atmospheric pressure and the compressor pressure suction and a pressure controller is configured to generate an open/close signal responsive to pressure signal to a control valve of the recirculation duct to open/close it according to the detected suction pressure.

19 Claims, 5 Drawing Sheets

(56) References Cited

U.S. PATENT DOCUMENTS

| | | | | |
|---|---|---|---|---|
| 11,067,046 | B2 | 7/2021 | Fältén | |
| 2005/0284154 | A1* | 12/2005 | Peter | F17C 3/08 62/53.2 |
| 2014/0137572 | A1 | 5/2014 | Steffen | |
| 2021/0148513 | A1 | 5/2021 | Lee et al. | |

* cited by examiner

METHOD AND AN APPARATUS FOR PREVENTING THE EMISSION OF HARMFUL GASES INTO ATMOSPHERE

SCOPE OF THE INVENTION

The present invention deals with harmful gas leaking at substantially atmospheric pressure from industrial plants, and in particular it relates to a method and to an apparatus to prevent the leaked gas from being released into the atmosphere.

PRIOR ART—TECHNICAL PROBLEMS

As well known, industrial plants processing chemicals in the gaseous state comprise pipe and equipment connections through which small gas leaks are likely to occur at a substantially atmospheric pressure. In particular, such leaks may take place through sealing elements of moving parts of the equipment used to convey a gas, such as compressors. Other leaks at atmospheric pressure can occur when taking samples of a process fluid for process control purposes. Occasional atmospheric pressure gas leaks at may also occur due to defected sealing of connections between plant equipment, such as piping, vessels and instruments.

In many instances, the processed gas is environmentally harmful and/or and/or flammable or capable of forming explosive mixtures with the air surrounding the leakage point.

As well known, a gas released at substantially atmospheric pressure cannot be admitted as such into a flare for combustion. Therefore, in these cases, in order to restore safety for people and animals, a "safe" area is normally identified, i.e., a place close to the plant, if any, where people and animals do not use to stay, and/or no sources of ignition are present, such as hot surfaces or electrical equipment with no suitable protection for an explosive atmosphere. A device is then provided for collecting and conveying the leaked gas from the leaking points to the safe area, as schematically shown in FIG. 5. Such a device usually comprise a gas collection means for each leakage stream 1, $\mathbf{1}_2$, $\mathbf{1}_3$ . . . $\mathbf{1}_n$, a collector tank 10 for the collected leaked gas, to which the collection means is pneumatically connected through respective piping $\mathbf{2}_1$, $\mathbf{2}_2$, $\mathbf{2}_3$ . . . $\mathbf{2}_n$, and a further piping 5 for conveying the gathered leakage streams to safe area 7.

However, a safe area is not always easily available. Moreover, with the above systems, the leaked streams are released as such into the atmosphere, which is particularly critical if the leaked gas includes greenhouse chemical such as methane and hydrocarbons in general. The problem is not negligible, as installations handling hydrocarbon gases, such as pipelines, chemical plants, power stations and the like, are widespread.

There is therefore a need for an apparatus and a method to collect gas streams leaking through sealing and connection elements in a gas-treating industrial plant, and released at substantially atmospheric pressure, in particular, hydrocarbon gases, to avoid their emission into the atmosphere.

A vent fluid handling assembly including a vent fuel recovery piping is disclosed, and a method for operating the same, are disclosed, for instance, in US 2019/0323464 A1.

SUMMARY OF THE INVENTION

It is therefore an object of the present invention to provide an apparatus and a method for collecting a gas leaked at a substantially atmospheric pressure in a gas-treating industrial plant, in particular hydrocarbon gases, without releasing the collected gas into the atmosphere.

It is also an object of the present invention to provide such an apparatus and a method that enable leaked gas collection without creating an excessive vacuum at the leakage points, in order not to suck too much ambient air along with the gas, and in order not to promote leakage by the vacuum.

It is a particular object of the invention to provide such apparatus and method that allows releasing the leaked gas in a safe area in the case of a failure of the apparatus itself, or of a power supply interruption.

These and other objects are achieved by an apparatus and a method for collecting leaked gas streams at a substantially atmospheric pressure from an industrial plant and conveying the collected gas to a reception body pressurised at a predetermined reception pressure, as defined by claims 1 and 11, respectively. Particularly advantageous embodiments and modifications of the apparatus and of the method are defined in the dependent claims.

According to one aspect of the invention, the apparatus comprises:

- a gas-capturing means for capturing the leaked gas streams;
- a collector container for collecting the leaked gas streams, the collector container pneumatically connected to the capturing means
- a compressor having a suction mouth pneumatically connected to the collector container;
- a recirculation duct;
- wherein the compressor has a delivery mouth pneumatically connected with:
  - the pressurised reception body, through a delivery pipe of the apparatus;
  - the collector container, via the recirculation duct, so as to convey a recirculation portion of the leaked gas compressed by compressor back into the collector container,
- a control unit for controlling compressor suction pressure, comprising:
  - a pressure sensor/transducer arranged to measure the compressor suction pressure and to generate a suction pressure signal;
  - a control valve mounted along the recirculation duct;
  - a pressure controller configured to receive the pressure signal and to generate an open/close signal for modifying an opening degree of the control valve responsive to the pressure signal, in order to maintain the suction pressure at a target pressure value between the atmospheric pressure and a predetermined minimum pressure.

According to another aspect of the invention, the method comprises the steps of:

- capturing the leaked gas streams;
- collecting the leaked gas streams into a collector container, thus forming a collected leaked gas;
- in a compressor, compressing the collected leaked gas up to the reception pressure, thus forming a compressed leaked gas;
- measuring a suction pressure of the compressor;
- conveying a main portion of the compressed leaked gas into the pressurised reception body;
- recirculating a portion of the compressed leaked gas back into the collector container, wherein the main portion and the recirculation portion of the compressed leaked gas are established according to the measured suction pressure, in such a way to maintain the suction pressure at a target pressure value between the atmospheric pressure and a predetermined minimum pressure.

Preferably, the minimum pressure is between −200 and −100 Pa, in particular the minimum pressure is about −150 Pa. The target pressure value is advantageously set between −50 Pa and the minimum pressure.

This way, by accurately controlling the partial vacuum, or negative relative pressure, created by compressor, in particular, in the collector container, the leaked gas can be regularly and selectively removed from the leakage points. More in detail, if such a control unit were not associated with the compressor, an excessive suction and/or vacuum degree would be created at the leakage points. In the former case, an undesirable amount of ambient air would be withdrawn at the collection points along with the leaked gas, which could lead to an explosive mixture and/or make it impossible to recover the gas for any technical use. In the latter case, which may occur if the leakage point is associated to a local collection container, an excessive local vacuum could paradoxically cause further leakage.

The apparatus and the method of the invention can be used, for instance, in such a plant as a compressor station of a pipeline, and the reception body of the collected and compressed leakage gas can be the pipeline itself. More in general, any plant including a compressor can advantageously use the apparatus of the invention, and the reception body can be any vessel, equipment, or pipeline to which compressor sends a compressed gas.

Advantageously, the pressure sensor/transducer is also arranged to detect a current value of the ambient atmospheric pressure and to generate the suction pressure signal as a differential pressure signal related to a difference between the atmospheric pressure and compressor suction pressure.

This way, the suction pressure control accuracy can be further improved, which is an advantage in connection with the above-mentioned desired low absolute values of the suction relative pressure.

Advantageously, the collector container is provided with a safety vent device configured to release the leaked gas, which is present in the collector container, into the atmosphere if the pressure of the collected leaked gas exceeds a predetermined maximum safety threshold value higher than the atmospheric pressure. In particular, the safety vent device can comprise a pressure relief valve, for example a counterbalance valve, arranged along a vent pipe leading to a safe area. In particular, the safety vent device, i.e., a pressure relief valve, is configured to release the collected leaked gas when the pressure of the collected leaked gas exceeds a safety maximum threshold value set between 1 mbar and 10 mbar.

This way, if an equipment failure occurs such as a sudden compressor failure or stop, or if a manoeuvre error is made when actuating a shut-off valve along compressor suction or delivery pipe, the safety level of the prior technology is restored, since the gas is released into the atmosphere in a safe area, which can be accepted in such an exceptional condition.

Preferably, a heat exchanger device is provided along the recirculation duct, the heat exchange device configured to cool the recirculation portion of the leaked gas conveyed to the collector container. This prevents the temperature of the gas collected in the collector container from reaching excessively high values, which would be inappropriate for admission to compressor, due to a hot recirculating gas portion entering the collector container.

A check valve can be arranged along the delivery pipe of compressor in order to prevent any pressurised-gas backflow from the pressurised reception body to the compressor and the collector container via the recirculation duct, if a compressor shutdown occurs, due for instance to a power failure, a compressor fault or an operator's mistake. Advantageously, the delivery pipe comprises a restricted-section pipe portion serially arranged to this check valve, e.g., downstream thereof, in order to limit such a pressurised-gas backflow if, besides a compressor fault, the check valve remains blocked at an open position.

In one embodiment, the apparatus comprises a second compressor arranged in parallel to the above-mentioned compressor, hereinafter referred to as the first compressor, and the pressure controller is configured to start the second compressor or the first compressor in addition to the first compressor or the second compressor, respectively, if the suction pressure becomes higher than a predetermined maximum operating threshold value.

The condition in which only one compressor is running can be restored manually. As an alternative, the pressure controller is configured to stop one between the first compressor and the second compressor if the suction pressure becomes lower than a predetermined switch-off threshold value that is in turn lower than or at most equal to the above maximum operating threshold value.

BRIEF DESCRIPTION OF THE DRAWINGS

The invention will be illustrated below with a description of some embodiments and modifications thereof, by way of example and not of limitation, with reference to the accompanying drawings, in which.

DESCRIPTION OF PREFERRED EMBODIMENTS

Figure 1:
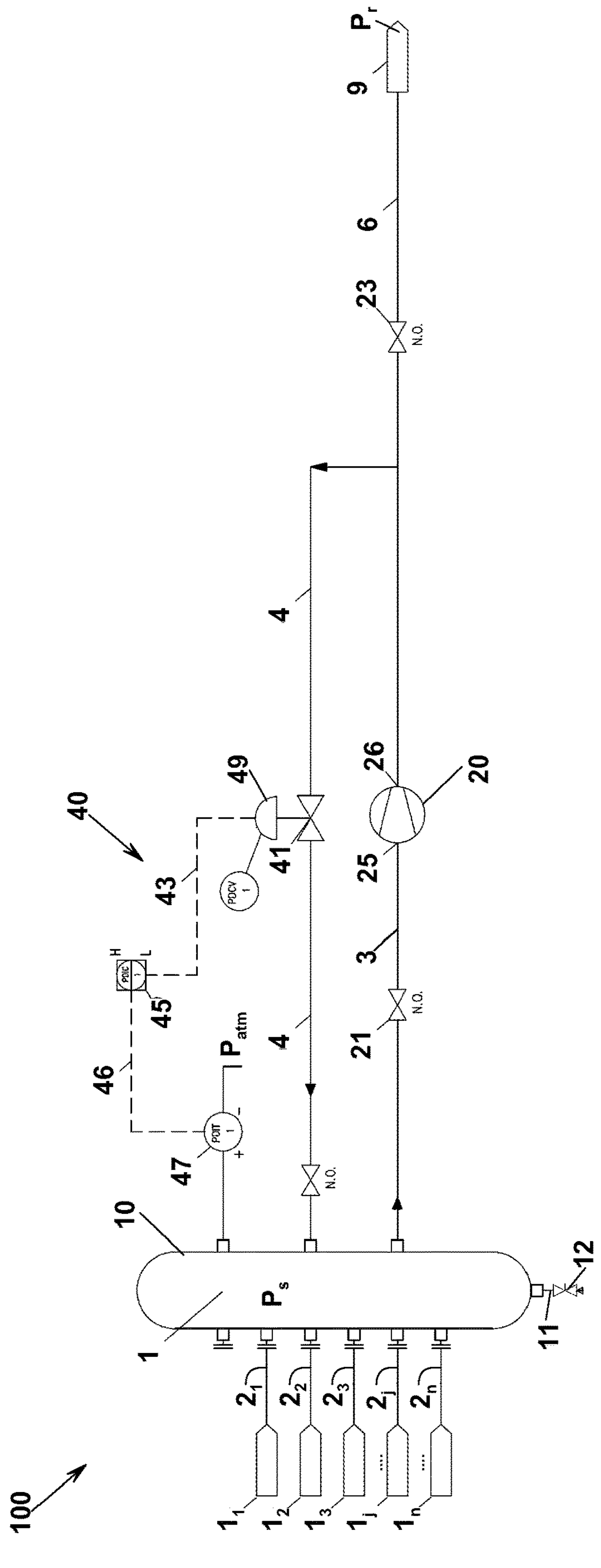
FIG. 1 is a flow diagram of an apparatus according to the invention.

With reference to FIG. 1, an apparatus 100 is described for conveying streams 1, $\mathbf{1}_2$, $\mathbf{1}_3$ . . . $\mathbf{1}_n$ of a gas leaked at substantially atmospheric pressure in an industrial plant, into a pressurised reception body 9 at a predetermined reception pressure $P_r$. For example the plant can be a natural gas compressor station of a pipeline, and the reception body can be the pipeline itself at its operating pressure $P_r$.

Apparatus 100 comprises a gas-capturing means, not shown, for capturing gas streams $\mathbf{1}_1$, $\mathbf{1}_2$, $\mathbf{1}_3$ . . . $\mathbf{1}_n$, or is associated with a gas-capturing means existing in the industrial plant, as it is provided in the conventional technique. A gas-capturing means may comprise a chamber encircling a possible leakage points of the plant, such as a vent of a gas sealing system, a stuffing box of a rotating or otherwise movable organs, a sampling sockets, a flange connection, and the like.

Apparatus 100 further comprises a preferably elongated vertical collector container 10 of leaked gas streams $\mathbf{1}_j$, j=1 . . . n, pneumatically connected with the gas-capturing means through collection pipes $\mathbf{2}_j$, j=2 . . . n. This way, streams $\mathbf{1}_j$ form a collected leaked gas 1 that is conveyed into collector container 10. The collector container can be a reservoir 10, as shown, and/or a simple manifold. Collector container 10 advantageously comprises a drain nozzle 11 with a drain valve 12 for periodically removing any liquid present in collected leaked gas 1 and accumulated in the bottom of collector container 10.

Apparatus 100 further comprises a compressor 20, preferably a diaphragm compressor, or a compressor of any type from which substantially no gas is likely to leak.

Compressor 20 has a suction mouth 25 pneumatically connected with collector container 10 via a suction pipe 3, and a delivery mouth 26 pneumatically connected with reception body 9 via a delivery pipe 6. Shut-off valves 21,23 can be arranged along suction pipe 3 and delivery pipe 6. These valve are preferably manually operated and are maintained open during normal operation of apparatus 100. Shut-off valves 21,23 can be closed to isolate compressor 20 or apparatus 100 from the rest of the system in case of maintenance or replacement of compressor 20.

Compressor 20 is arranged to compress collected leaked gas 1 up to reception pressure $P_r$ of reception body 9, generally set between a few bars and a few tens of bars. Compressor 20 is also arranged to maintain a suction pressure $P_s$, in particular the pressure in collector container 10, at a value of about few millibars below atmospheric pressure $P_{atm}$.

To this purpose, according to the invention, delivery mouth 26 of compressor 20 is also connected with collector container 10 through a recirculation duct 4, and a pressure control unit 40 is provided to control suction pressure $P_s$ of compressor 20, comprising a control valve 41 arranged along recirculation duct 4.

Control unit 40 further comprises a pressure sensor/transducer 47 arranged to detect pressure $P_s$ at the suction to compressor 20 and to generate a suction pressure signal 46. As shown FIG. 1, pressure sensor/transducer 47 can be mounted, for instance, to collector container 10, or to suction pipe 3.

Control unit 40 further comprises a pressure controller 45, preferably an electronic controller, configured to receive pressure signal 46 from pressure sensor/transducer 47, and to generate an open/close signal 43 for an actuator 49 of control valve 41. Actuator 49 is arranged to modify the opening of control valve 41 responsive to pressure signal 46, in order to maintain suction pressure $P_s$ at a target pressure value between atmospheric pressure $P_{atm}$ and a predetermined minimum pressure $P_m$. In practice, by recirculating a part of the flow of leaked gas 1 back into collection container 10, a balance is established between the flow rate of leaked gas 1 from the leakage points and the flow rate delivered by compressor 20 at reception pressure $P_r$.

Preferably, the minimum relative pressure $P_m$ is set between −200 Pa and −100 Pa, in particular $P_m$ is about to −150 Pa. The target pressure value, as a gauge pressure, is preferably set between a maximum gauge pressure of e.g., −50 Pa and the minimum gauge pressure $P_m$.

Advantageously, pressure sensor/transducer 47 is a differential pressure transducer arranged between a location upstream of compressor 20 and the atmosphere, for example between collection container 10 and the atmosphere, and is configured to measure both positive relative pressures and negative relative pressures, generally in a measuring range of −20 mbar÷+20 mbar (−2 kPa÷+2 kPa). In other words, pressure sensor/transducer 47 is arranged to detect a current value of atmospheric pressure $P_{atm}$ in addition to suction pressure $P_s$ of compressor 20, and is configured to generate suction pressure signal 46 as a differential pressure signal related to a difference between atmospheric pressure $P_{atm}$ and suction pressure $P_s$ of compressor 20.

Besides controlling suction pressure $P_s$ of compressor 20, recirculation duct 4 serves to make the compressor start-up easier.

Figure 2:
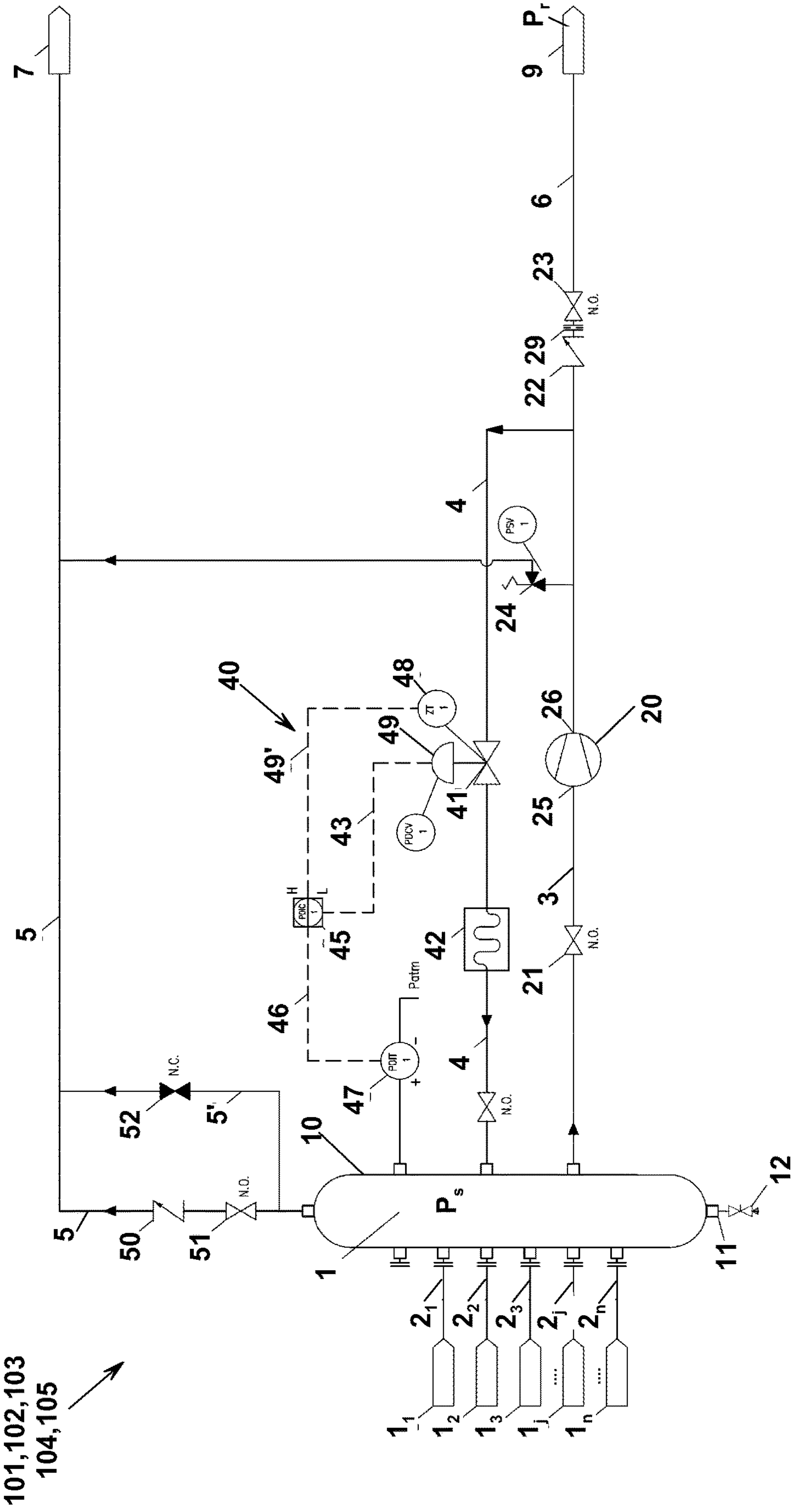
FIG. 2 is a flow diagram showing features of apparatuses according to some embodiments of the invention.

With reference to FIG. 2, some embodiments of the apparatus further include respective features that are described hereinafter. Although all these features are represented in the same FIG. 2, they may be present independently from one another, alone or in combinations of some of these features.

In an apparatus 101 according to one embodiment of the invention, a check valve 22 is preferably arranged along delivery pipe 6 of compressor 20 in order to prevent pressurised-gas backflow from pressurised reception body 9 towards compressor 20 and collector container 10 via recirculation duct 4 if a shutdown of compressor 20 occurs, typically a shutdown due to a sudden compressor failure or to a sudden power supply interruption. Moreover, a restricted-section pipe portion 29, such as a calibrated orifice, can advantageously be serially arranged to check valve 22 along delivery pipe 6, preferably downstream of check valve 22, in order to limit the pressurised gas flow from pressurised reception body 9 towards compressor 20 and towards collector container 10 if check valve 22 does not close or does not close completely in case of a sudden stop of compressor 20.

In an apparatus 102 according to another embodiment, collector container 10 is provided with a safety vent device for releasing collected leaked gas 1 from collector container 10 into the atmosphere in a safe zone 7, only if pressure $P_s$ of collected leaked gas 1 exceeds a predetermined safety maximum threshold value $P_{Ms}$ higher than atmospheric pressure $P_{atm}$, due to any breakdown or failure of apparatus 102. In particular, as shown in FIG. 2, the safety vent device comprises a vent pipe 5 leading to atmosphere in safe area 7, and an overpressure i.e. pressure relief valve 50 such as a counterbalance valve arranged along vent pipe 5. In particular, the safety vent device, i.e., the pressure relief valve 50, is configured to release collected leaked gas 1 from collector container 10 when pressure $P_s$ of leaked gas 1 exceeds a predetermined maximum pressure $P_{Ms}$ set between 1 mbar and 10 mbar (100-1000 Pa), for example 2 mbar (200 Pa).

Moreover, in an improved modification of apparatus 102, the safety vent device comprises a bypass pipe 5' connected between upstream and downstream of pressure relief valve 50, and first and second shut-off valves 51,52 arranged along vent pipe 5 and bypass pipe 5', respectively. First and second shut-off valves 51,52 are operated as a normally open valve and a normally closed valve, respectively, during normal operation of apparatus 102. This valve arrangement is useful to allow maintenance of pressure relief valve 50 while continuing to remove gas from the plant and releasing it into safe area 7 also during the short time required by the maintenance.

In a further embodiment, an apparatus 103 comprises a safety valve 24 having an inlet port pneumatically connected with delivery mouth 26 of compressor 20.

In a modification of this apparatus 103, further including the above-described safety vent device of apparatus 102, a discharge port of safety valve 24 is pneumatically connected with vent pipe 5, downstream of pressure relief valve 50.

In an apparatus 104 according to a further embodiment, a heat exchange device 42 is provided along recirculation duct 4, preferably downstream of control valve 41. Heat exchange device 42 is configured to cool the gas recirculating back to collection container 10, so that leaked gas 1 in collection container 10 does not attain a temperature too high for admission to compressor 20.

In an apparatus 105 according to a further embodiment, control valve 41 is associated with a positioning device 48 including a position sensor configured to detect the position of a plug member of control valve 41 and to generate a position signal 49' for modifying the position of the plug member and the opening degree of control valve 41. Pressure controller 45 is configured to receive position signal 49' in addition to suction pressure signal 46, and to modify open/close signal 43 based on position signal 49'.

Figure 3:
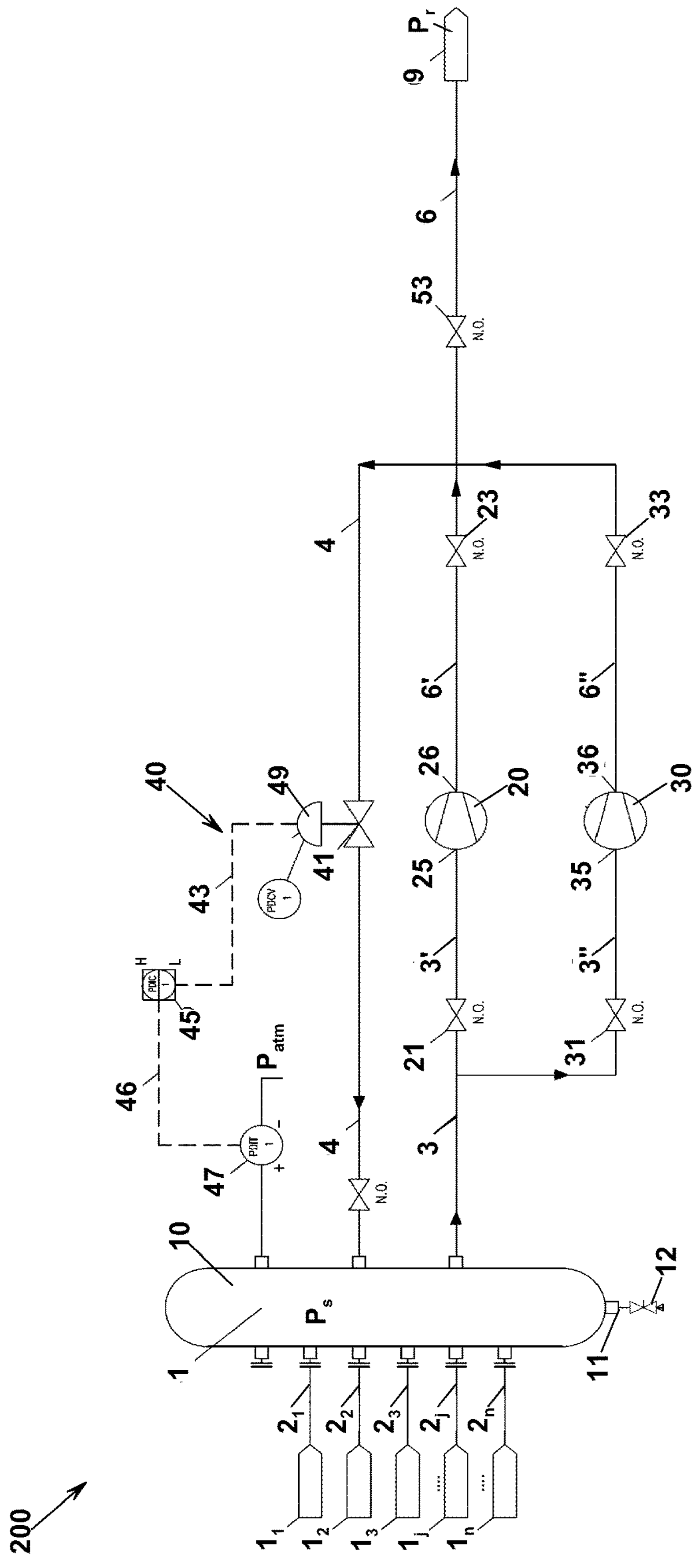
FIG. 3 is a flow diagram of an apparatus according to the invention, in which two parallel-arranged compressors are provided.

With reference to FIG. 3, an apparatus 200, according to a further embodiment of the invention, comprises a plurality of parallel arranged compressors, in particular a first compressor 20 and a second compressor 30. In this case, control unit 40 is configured to automatically start second compressor 30 or first compressor 20 in addition to first compressor 20 or second compressor 30, respectively, if suction pressure $P_s$ upstream of compressor 20,30 exceeds a predetermined maximum operating threshold value $P_{Me}$. This can occur if a breakdown of the other compressor 20 or 30 occurs. Control unit 40 can also be configured to automatically stop only one between first and the second compressors 20,30 if suction pressure $P_s$ becomes lower than a predetermined shutdown threshold value $P_R$ that is in turn lower than or at most equal to maximum operating threshold value $P_{Me}$. As an alternative, once the breakdown has been corrected, one of the two compressors can be stopped manually by an operator.

Similarly to apparatus 100 shown in FIG. 1, each compressor 20,30 can be equipped with a respective shut-off valve 21,31 on its suction branch 3',3" and with a respective shut-off valve 23,33 on its delivery branch 6',6", to allow maintenance of one of the compressors 20,30 while the other compressor 30,20 is running, and apparatus 200 is operative. Delivery branches 6',6" come together into the common delivery pipe 6, along which an additional shut-off valve 53 can be provided.

Figure 4:
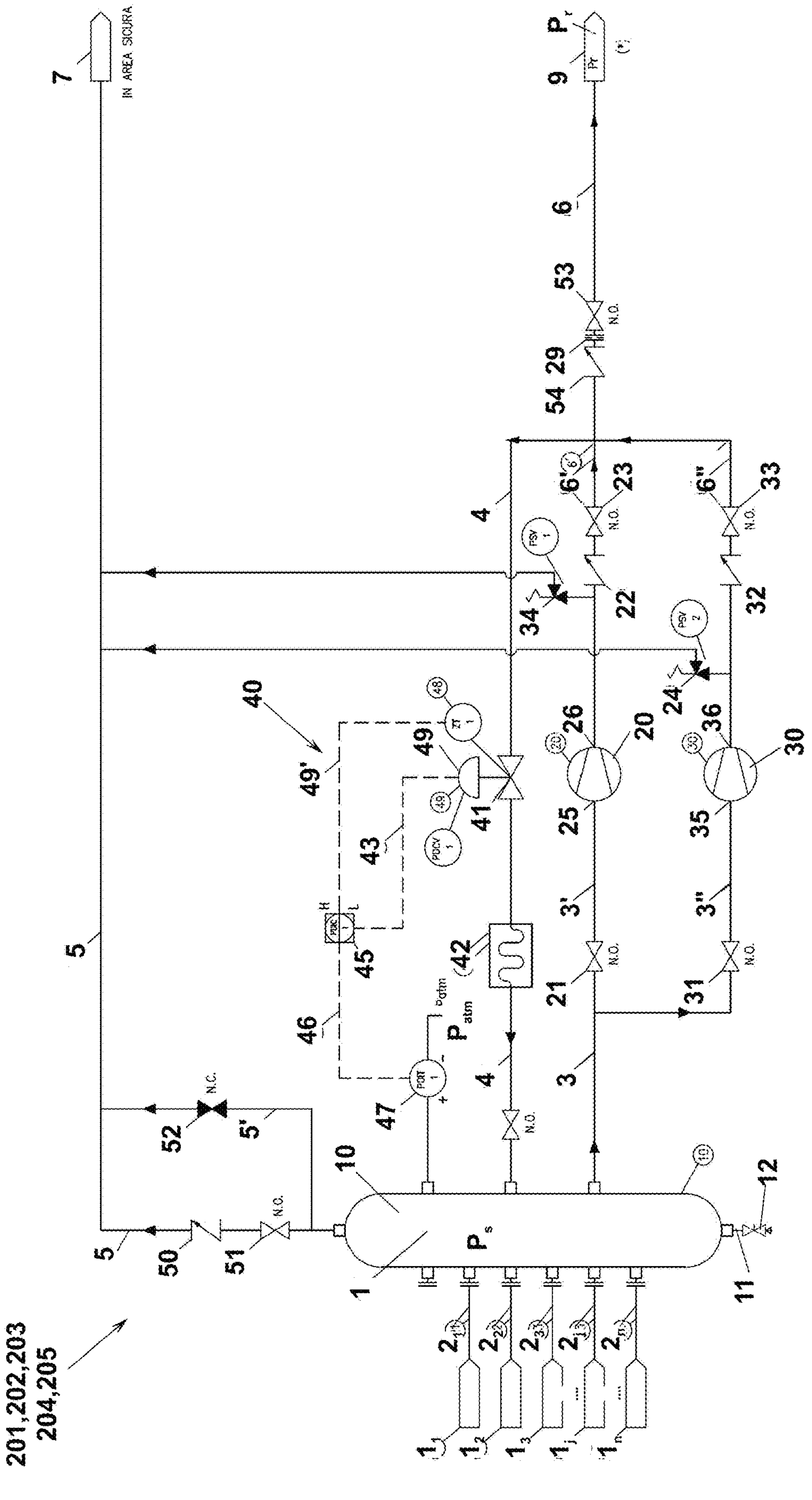
FIG. 4 is a flow diagram showing features of apparatuses according to some embodiments of the invention, in which two parallel-arranged compressors are provided.
Figure 5:
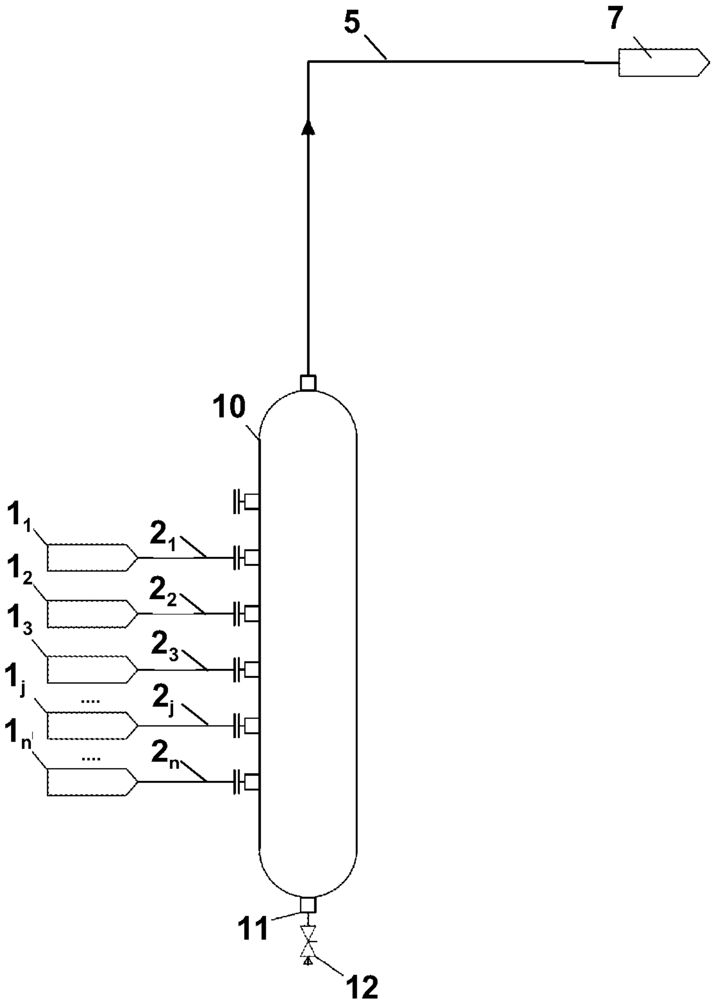
FIG. 5 is a flow diagram of a device for treating gas streams of gaseous matter leaking at substantially atmospheric pressure, according to the prior art.

With reference to FIG. 4, some embodiments of the apparatus further include respective features that are described hereinafter. Although all these features are represented in the same FIG. 4, they may be present independently from each other, alone or in combinations of some of these features.

In an apparatus 201 according to one embodiment of the invention, a check valve 54 is preferably arranged along common delivery pipe 6 of compressors 20 and 30 in order to prevent pressurised-gas backflow from pressurised reception body 9 towards compressor 20 and collector container 10 via recirculation duct 4 if a shutdown of compressor 20 or 30 occurs, typically a shutdown due to a sudden compressor failure or to a sudden power supply interruption. A similar flow-limiting function can have check valves 22,32. Moreover, a restricted-section pipe portion 29, such as a calibrated orifice, can advantageously be serially arranged to check valve 54 along common delivery pipe 6, preferably downstream of check valve 54, in order to limit the pressurised gas flow from pressurised reception body 9 towards compressor 20 and collector container 10 if check valve 54 does not close or does not close completely in case of a sudden stop of compressor 20 or 30.

An apparatus 202 according to another embodiment comprises a safety vent device for releasing collected leaked gas 1 from collector container 10 into the atmosphere, if the pressure of collected leaked gas 1 exceeds a predetermined safety maximum threshold value $P_{Ms}$ higher than atmospheric pressure $P_{atm}$, as in apparatus 102 of FIG. 2.

An apparatus 203 according to a further embodiment comprises two safety valves 24,34 to prevent exceeding the maximum operating pressure of compressors 20,30, each safety valve 24,34 having its inlet port pneumatically connected with delivery mouths 26,36 of compressors 20 and 30 respectively, and with its outlet port pneumatically connected with emergency vent pipe 5, if present.

An apparatus 204 according to a still further embodiment comprises a heat exchange device configured to cool the gas recirculating to collector container 10, such as the apparatus 104 of FIG. 2.

In an apparatus 205 according to a still further embodiment, a control valve 41 comprises a positioning device 48, as in apparatus 105 in FIG. 2.

The above description of embodiments and modifications of the invention is capable of showing the invention from a conceptual point of view in such a way that others, using the known technique, will be able to modify and/or adapt in various applications such specific embodiments without further research and without departing from the inventive concept, and, therefore, it is understood that such adaptations and modifications will be considered as equivalents of the modifications and specific embodiments. The means and materials for realising the various functions described may be of various kinds without departing from the scope of the invention. It is understood that the expressions or terminology used are purely descriptive and, therefore, not limitative.

The invention claimed is:

1. An apparatus for conveying leaked gas streams leaking at an atmospheric pressure from an industrial plant to a reception body that is pressurised at a predetermined reception pressure, said apparatus comprising:

- a gas-capturing means for capturing said leaked gas streams;
- a collector container for collecting said leaked gas streams forming a collected leaked gas, said collector container pneumatically connected to said gas-capturing means;
- a compressor arranged to compress said collected leaked gas up to said reception pressure, thus forming a compressed leaked gas having a suction mouth pneumatically connected to said collector container; and
- a recirculation duct;

wherein said compressor has a delivery mouth pneumatically connected with:
- said reception body, through a delivery pipe of said apparatus; and
- said collector container, via said recirculation duct, so as to convey a recirculation portion of said compressed leaked gas back into said collector container, said apparatus also comprising:
- a pressure sensor/transducer arranged to measure a compressor suction pressure and to generate a suction pressure signal;
- a control valve mounted along said recirculation duct; and
- a pressure controller configured to receive said pressure signal and to generate an open/close signal for modifying an opening degree of said control valve responsive to said pressure signal, in order to maintain said suction pressure at a target pressure value between the atmospheric pressure and a predetermined minimum pressure, so as to control said suction pressure at said compressor, wherein said pressure sensor/transducer is further arranged to detect a current value of said atmospheric pressure and to generate said suction pressure signal as a differential pressure signal related to a difference between said atmospheric pressure and said compressor suction pressure.

2. The apparatus according to claim 1, wherein said compressor is a fully sealed compressor.

3. The apparatus according to claim 1, wherein said compressor is a diaphragm compressor.

4. The apparatus according to claim 1, wherein said collector container is provided with a safety vent device configured to release said collected leaked gas, which is present in said collector container, into an atmosphere if the pressure of said collected leaked gas exceeds a predetermined safety maximum threshold value higher than the atmospheric pressure, said safety maximum threshold value set between 1 mbar and 10 mbar.

5. The apparatus according to claim 4, wherein said safety vent device comprises a pressure relief valve arranged along a vent pipe with an outlet in a safe area.

6. An apparatus for conveying leaked gas streams leaking at an atmospheric pressure from an industrial plant to a reception body that is pressurised at a predetermined reception pressure, said apparatus comprising:

a gas-capturing means for capturing said leaked gas streams;

a collector container for collecting said leaked gas streams forming a collected leaked gas, said collector container pneumatically connected to said gas-capturing means;

a compressor arranged to compress said collected leaked gas up to said reception pressure, thus forming a compressed leaked gas having a suction mouth pneumatically connected to said collector container; and a recirculation duct;

wherein said compressor has a delivery mouth pneumatically connected with:

said reception body, through a delivery pipe of said apparatus; and said collector container, via said recirculation duct, so as to convey a recirculation portion of said compressed leaked gas back into said collector container, said apparatus also comprising:

a pressure sensor/transducer arranged to measure a compressor suction pressure and to generate a suction pressure signal;

a control valve mounted along said recirculation duct; and a pressure controller configured to receive said pressure signal and to generate an open/close signal for modifying an opening degree of said control valve responsive to said pressure signal, in order to maintain said suction pressure at a target pressure value between the atmospheric pressure and a predetermined minimum pressure, so as to control said a suction pressure at said compressor, wherein a heat exchange device is provided along said recirculation duct, said heat exchange device configured to cool said recirculation portion of said leaked gas conveyed to said collector container.

7. The apparatus according to claim 6, wherein said compressor is a diaphragm compressor.

8. The apparatus according to claim 6, wherein said collector container is provided with a safety vent device configured to release said collected leaked gas, which is present in said collector container, into an atmosphere if the pressure of said collected leaked gas exceeds a predetermined safety maximum threshold value higher than the atmospheric pressure, said safety maximum threshold value set between 1 mbar and 10 mbar.

9. An apparatus for conveying leaked gas streams leaking at an atmospheric pressure from an industrial plant to a reception body that is pressurised at a predetermined reception pressure, said apparatus comprising:

a gas-capturing means for capturing said leaked gas streams;

a collector container for collecting said leaked gas streams forming a collected leaked gas, said collector container pneumatically connected to said gas-capturing means;

a compressor arranged to compress said collected leaked gas up to said reception pressure, thus forming a compressed leaked gas having a suction mouth pneumatically connected to said collector container; and a recirculation duct;

wherein said compressor has a delivery mouth pneumatically connected with:

said reception body, through a delivery pipe of said apparatus; and said collector container, via said recirculation duct, so as to convey a recirculation portion of said compressed leaked gas back into said collector container, said apparatus also comprising:

a pressure sensor/transducer arranged to measure a compressor suction pressure and to generate a suction pressure signal;

a control valve mounted along said recirculation duct; and a pressure controller configured to receive said pressure signal and to generate an open/close signal for modifying an opening degree of said control valve responsive to said pressure signal, in order to maintain said suction pressure at a target pressure value between the atmospheric pressure and a predetermined minimum pressure, so as to control said a suction pressure at said compressor, wherein a check valve is arranged along said delivery pipe of said compressor to prevent a pressurised-gas backflow from said reception body towards said compressor and towards said collector container via said recirculation duct, if said compressor stops, wherein said delivery pipe comprises a restricted-section pipe portion serially arranged to said check valve in order to limit said pressurised-gas backflow, if said compressor stops and said check valve does not close.

10. The apparatus according to claim 9, wherein said compressor is a diaphragm compressor.

11. The apparatus according to claim 9, wherein said collector container is provided with a safety vent device configured to release said collected leaked gas, which is present in said collector container, into an atmosphere if the pressure of said collected leaked gas exceeds a predetermined safety maximum threshold value higher than the atmospheric pressure, said safety maximum threshold value set between 1 mbar and 10 mbar.

12. An apparatus for conveying leaked gas streams leaking at an atmospheric pressure from an industrial plant to a reception body that is pressurised at a predetermined reception pressure, said apparatus comprising:

a gas-capturing means for capturing said leaked gas streams;

a collector container for collecting said leaked gas streams forming a collected leaked gas, said collector container pneumatically connected to said gas-capturing means;

a compressor arranged to compress said collected leaked gas up to said reception pressure, thus forming a compressed leaked gas having a suction mouth pneumatically connected to said collector container; and a recirculation duct;

wherein said compressor has a delivery mouth pneumatically connected with:

said reception body, through a delivery pipe of said apparatus; and said collector container, via said recirculation duct, so as to convey a recirculation portion of said compressed leaked gas back into said collector container, said apparatus also comprising:

a pressure sensor/transducer arranged to measure a compressor suction pressure and to generate a suction pressure signal;

a control valve mounted along said recirculation duct; and a pressure controller configured to receive said pressure signal and to generate an open/close signal for modifying an opening degree of said control valve responsive to said pressure signal, in order to maintain said suction pressure at a target pressure value between the atmospheric pressure and a predetermined minimum pressure, so as to control said a suction pressure at said compressor, wherein said compressor is a first compressor, and said apparatus comprises a second compressor arranged in parallel to said first compressor, and said pressure controller is configured to start said second compressor or said first compressor in addition to said first compressor or to said second compressor respectively, if said suction pressure becomes higher than a predetermined maximum operating threshold value.

13. The apparatus according to claim 12, wherein said pressure controller is configured to stop one of said first and said second compressors if said suction pressure becomes lower than a predetermined switch-off threshold value that is lower than or at most equal to said maximum operating threshold value.

14. The apparatus according to claim 12, wherein said compressor is a diaphragm compressor.

15. The apparatus according to claim 12, wherein said collector container is provided with a safety vent device configured to release said collected leaked gas, which is present in said collector container, into an atmosphere if the pressure of said collected leaked gas exceeds a predetermined safety maximum threshold value higher than the atmospheric pressure, said safety maximum threshold value set between 1 mbar and 10 mbar.

16. A method for conveying leaked gas streams, leaking at an atmospheric pressure from an industrial plant to a reception body that is pressurised at a predetermined reception pressure, said method comprising steps of:

capturing said leaked gas streams;

collecting said leaked gas streams into a collector container, thus forming a collected leaked gas;

in a compressor, compressing said collected leaked gas up to said reception pressure, thus forming a compressed leaked gas;

measuring a suction pressure of said compressor;

conveying a main portion of said compressed leaked gas into said reception body; and recirculating a portion of said compressed leaked gas back into said collector container, wherein said main portion and said recirculation portion of said compressed leaked gas are established according to said measured suction pressure, in such a way to maintain said suction pressure at a target pressure value between the atmospheric pressure and a predetermined minimum pressure.

17. The method according to claim 16, wherein said minimum pressure is set between −200 and −100 Pa relative.

18. The method according to claim 16, wherein said minimum pressure is about −150 Pa relative.

19. The method according to claim 16, wherein said target value is between −50 Pa relative and said minimum pressure.

* * * * *